J. C. MOORE.
CLUTCH DEVICE.
APPLICATION FILED JAN. 21, 1914.
1,154,196.
Patented Sept. 21, 1915.
2 SHEETS—SHEET 1.
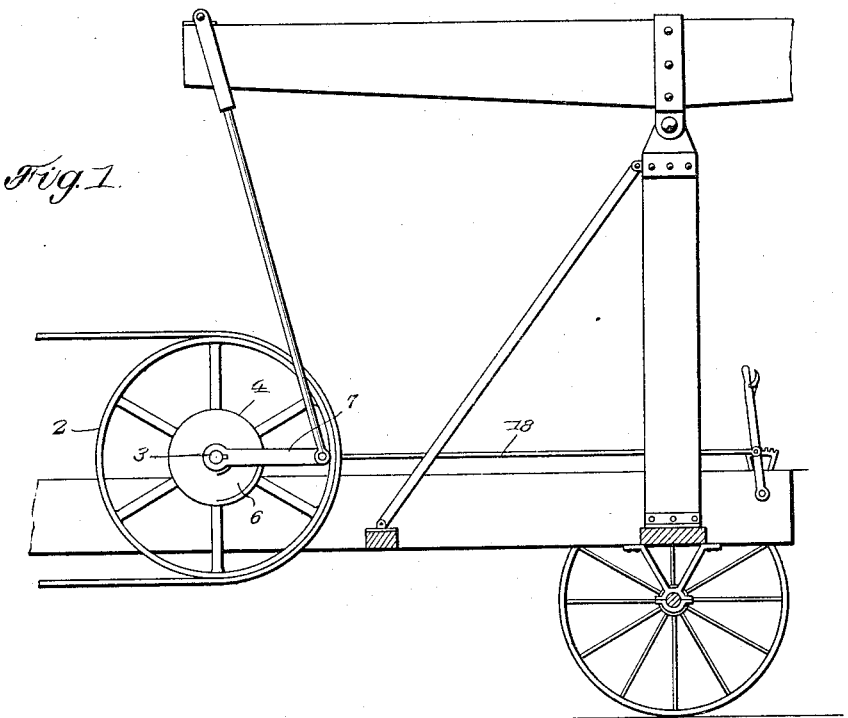
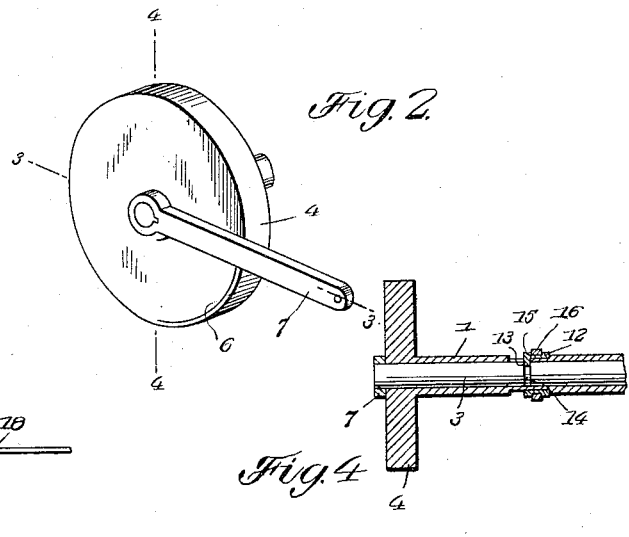
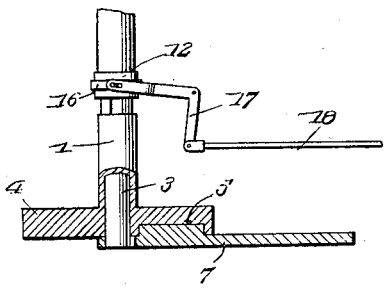
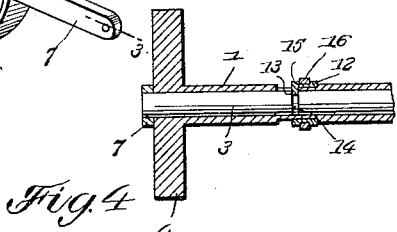
Witnesses
J. H. Crawford
D. W. Gould
Inventor
J. C. Moore,
By Victor J. Evans
Attorney

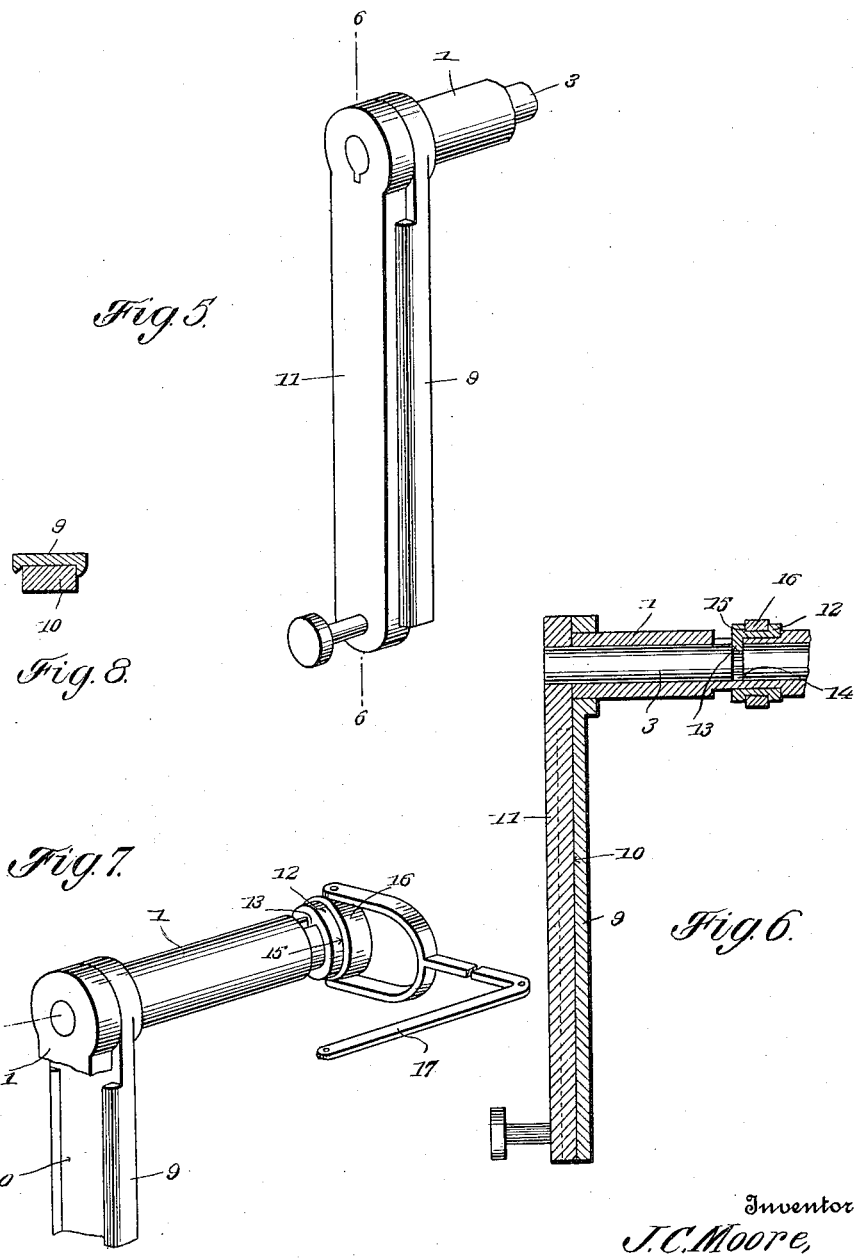

UNITED STATES PATENT OFFICE.

JESSE C. MOORE, OF MOUNTAIN VIEW, OKLAHOMA.

CLUTCH DEVICE.

1,154,196. Specification of Letters Patent. Patented Sept. 21, 1915.

Application filed January 21, 1914. Serial No. 813,487.

*To all whom it may concern:*

Be it known that I, JESSE C. MOORE, a citizen of the United States, residing at Mountain View, in the county of Kiowa and State of Oklahoma, have invented new and useful Improvements in Clutch Devices, of which the following is a specification.

This invention relates to clutch devices and has for its primary object the provision of a clutch constructed of sections with means for controlling the movement of one section with relation to the other to permit the sections to be interlocked for transmitting motion.

The invention in the preferred form of details will be described in the following specification, reference being had particularly to the accompanying drawings, in which:—

Figure 1 is a view in elevation, illustrating the application of the improvement. Fig. 2 is an enlarged perspective view of the improvement in its preferred form. Fig. 3 is a section on line 3—3 of Fig. 2. Fig. 4 is a section on line 4—4 of Fig. 2. Fig. 5 is a perspective view of a modified form of crank. Fig. 6 is a section on line 6—6 of Fig. 5. Fig. 7 is a perspective view partly broken out illustrating the manual control for the shifting shaft. Fig. 8 is a horizontal section through the improved crank arm.

In the preferred form the main shaft 1 on which is mounted the power driven wheel 2 is cored for a portion of its length to slidably receive what I term a shifting shaft 3. The crank proper is arranged on the main shaft 1 and in the form described comprises a disk shaped section 4. The operative face of the disk 4 is formed with a radial depression 5 having its terminals within the edges of the disk, as shown. From the point diametrically opposite the recess 5 that surface of the disk which is coextensive radially with the length of the recess is gradually cut away so as to form from such diametrically opposite point a gradually inclined surface 6, which leads to and through one edge of the recess, whereby one edge of the recess projects beyond the opposing edge, as will be plain from the drawings. Keyed or otherwise secured upon the shifting shaft 3 is an operative section of the crank including an arm 7 of any desired or appropriate length, which arm is terminally formed for connection at 2 of the link connecting such crank section with the walking beam or spudding sheave. The crank arm 7 on the face next the disk 4 is provided with an offset 8 corresponding in size to that of the recess 5.

It will be obvious from the above description that with the projection 8 seated in the recess 5, the respective sections of the crank are locked together so that the disk section 4 which is continually rotating under the influence of the power will similarly and simultaneously operate the section 7 for the cranking operation.

In Fig. 5 I have shown a slightly modified form of crank construction, the arrangement of the main shaft, and shifting shaft being identical with that previously described being for convenience similarly numbered. In this instance, the crank proper comprises a main section 9 keyed upon the main shaft and formed with a longitudinally extending recess 10 of the opposite face thereof. The arm section 11, keyed or otherwise secured upon the shifting shaft has a width permitting it to seat within the recess 10 when the shifting shaft has been properly operated, the free end of the arm section 11 being formed for connection with the operating link.

As a means for operating the shifting shaft 3, I arrange upon the main shaft 1 a collar 12 from which a projection 13 extends into an annular channel 14 formed in the shifting shaft. The collar is circumferentially channeled at 15 to receive an operating ring 16 connected through the medium of the angular lever 17 with the operating arm 18 in turn connected to the hand lever mounted on an appropriate part of the machine.

The means described for operating the shifting shaft is intended to illustrate the simple type of means to accomplish the desired result and in this connection it is to be understood that I contemplate any appropriate means for shifting said shaft even to the extent of coring the main shaft throughout its length and passing the shifting shaft wholly through and beyond the same to permit its direct shifting through any appropriate or well understood type of mechanism.

From the above description it will be obvious that the power wheel may be continuously operated and the free mechanism connected end of the crank interlocked with or unlocked from said wheel without in any way interfering with the rotation of the latter, the operation of interlocking the parts in the preferred form being readily accomplished through the projection 8 riding down the inclined section 6 of the disk 4 and into the channel.

What is claimed is:—

1. In combination with a hollow drive shaft of a drilling machine, of a clutch mechanism therefor comprising a disk secured to said drive shaft, said disk being provided with a radial depression, a shifting shaft mounted in said drive shaft, a crank arm secured to said shifting shaft and provided with an offset portion adapted to be seated in said depression and a shifting lever engaging said shifting shaft for shifting said offset portion into and out of said depression.

2. In combination with a hollow drive shaft of a drilling machine, said shaft having a lateral recess which communicates with the interior thereof, of a clutch mechanism therefor comprising a disk secured to said drive shaft and provided with a radial depression, a shifting shaft mounted in said drive shaft and provided with an annular channel, a crank arm secured to one end thereof, said crank arm being provided with an offset portion adapted to be seated in the depression and a shifting lever having a portion thereof passing through the recess in the drive shaft and engaging the walls of the annular channel for shifting said offset portion into and out of said depression.

In testimony whereof I affix my signature in presence of two witnesses.

JESS. C. MOORE.

Witnesses:
E. F. PAXSON,
E. C. MORRIS.

Copies of this patent may be obtained for five cents each, by addressing the "Commissioner of Patents, Washington, D. C."